(12) United States Patent
Okamura et al.

(10) Patent No.: US 6,722,286 B2
(45) Date of Patent: Apr. 20, 2004

(54) STRUCTURE AND RAILWAY CAR

(75) Inventors: Hisanori Okamura, Tokai-mura (JP); Isao Funyuu, Takahagi (JP); Akihiro Satou, Hitachi (JP); Kinya Aota, Hitachi (JP); Masakuni Ezumi, Kudamatsu (JP); Yasuo Ishimaru, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 10/188,865

(22) Filed: Jul. 5, 2002

(65) Prior Publication Data

US 2003/0005852 A1 Jan. 9, 2003

Related U.S. Application Data

(63) Continuation of application No. 09/459,864, filed on Dec. 14, 1999.

(51) Int. Cl.[7] .............................................. B61D 17/04
(52) U.S. Cl. ...................... 105/396; 105/401; 52/638; 228/112.1
(58) Field of Search ................... 105/396, 397, 105/401, 402, 409, 410; 52/638, 643, 633, 690, 222.8, 223.12; 428/98; 228/112.1, 2.1; 403/270, 271; 29/402.11, 402.09, 889.1, 522.1

(56) References Cited

U.S. PATENT DOCUMENTS

| | | | |
|---|---|---|---|
| 4,711,762 A | * 12/1987 | Vernam et al. ............ 420/532 |
| 4,794,032 A | 12/1988 | Fujii et al. | |
| 4,975,243 A | 12/1990 | Scott et al. | |
| 5,098,007 A | 3/1992 | Tsuruda et al. | |
| 5,267,515 A | * 12/1993 | Tsuruda et al. ............ 105/397 |
| 5,302,342 A | 4/1994 | Kawabe et al. | |
| 5,306,362 A | 4/1994 | Gupta et al. | |
| 5,407,636 A | 4/1995 | Kita | |
| 5,460,317 A | 10/1995 | Thomas et al. | |
| 5,611,479 A | 3/1997 | Rosen | |
| 5,616,189 A | 4/1997 | Jin et al. | |
| 5,685,229 A | 11/1997 | Ohara et al. | |
| 5,690,035 A | 11/1997 | Hatayama et al. | |
| 5,769,306 A | 6/1998 | Colligan | |
| 5,813,592 A | * 9/1998 | Midling et al. ........... 228/112.1 |
| 6,050,474 A | * 4/2000 | Aota et al. ............... 228/112.1 |
| 6,237,829 B1 | * 5/2001 | Aota et al. ............... 228/2.1 |
| 6,250,037 B1 | * 6/2001 | Ezumi et al. ............. 52/592.1 |
| 6,419,144 B2 | * 7/2002 | Aota et al. ............... 228/112.1 |
| 6,471,112 B2 | * 10/2002 | Satou et al. ............. 228/112.1 |

FOREIGN PATENT DOCUMENTS

| | | | |
|---|---|---|---|
| EP | 0474510 A1 | * 3/1992 | |
| EP | 474510 A1 | * 3/1992 | .......... B61D/17/04 |
| EP | 992314 A2 | * 4/2000 | .......... B23K/20/12 |
| GB | 2090289 A | * 12/1980 | |
| JP | 7-505090 | 6/1995 | |

(List continued on next page.)

OTHER PUBLICATIONS

Official Communication dated Sep. 4, 2002 for JP Hesei 9–154748.

(List continued on next page.)

Primary Examiner—S. Joseph Morano
Assistant Examiner—Frantz F. Jules
(74) Attorney, Agent, or Firm—Antonelli, Terry, Stout & Kraus, LLP

(57) ABSTRACT

In a railway car, extruded frame members of an aluminum base alloy containing Si of 0.4–0.9 wt % and Mg of 0.4–1.2 wt % are welded according to a friction stir welding method. In a structure, an aluminum base alloy plate containing Si of 0.4–0.9 wt % and Mg of 0.4–1.2 wt % is prepared, to one face of the aluminum base alloy plate a rib is formed, and the aluminum base alloy plate is an extruded frame member. Accordingly, a railway car having a low welding distortion and a structure having a low welding distortion can be obtained.

12 Claims, 4 Drawing Sheets

FOREIGN PATENT DOCUMENTS

| | | |
|---|---|---|
| JP | 10-216964 | 8/1998 |
| JP | 10-263852 | 10/1998 |
| WO | WO-02055750 A2 * | 7/2002 |

OTHER PUBLICATIONS

C.J. Dawes, "An introduction to friction stir welding and its development", Welding and Metal Fabrication, (England), International Trade Publications, vol. 63, No. 1, pp. 13–14 and 16, 1995.

Japanese Standard Institute; "JIS Handbook Non–ferrous Metal", First Edition, Foundation Japanese Standard Institute; Apr. 20, 1995, pp. 434–444.

Light–Metal Vehicle Institute; Light–Metal Vehicle Committee Report; Showa 53–Showa 58; Foundation Japanese Railway Vehicle Industrial Committee; Foundation Light–Metal Institute; Jul. 15, Showa 59; pp. 193–196.

* cited by examiner

STRUCTURE AND RAILWAY CAR

This application is a Continuation application of application Ser. No. 09/459,864, filed Dec. 14, 1999.

BACKGROUND OF THE INVENTION

The present invention relates to a structure comprised of aluminum alloy and to a railway car comprised of aluminum alloy; and, in particular, the invention relates to a structure, such as a body of a railway car, an automobile, a ship, an air plane, an elevator and a pressure vessel, and to the construction of a railway car.

A technique for friction stir welding is disclosed in Japanese application patent announcement laid-open publication No. Hei 7-505090, in which a rotary tool made of a material which is substantially harder than a member to be subjected to processing is inserted into a welding portion of two members to be subjected to processing, and the rotary tool is rotated and moved along a welding line, whereby it is possible to carry out a continuous friction stir welding along the welding line direction of the members to be subjected to processing.

Namely, this friction stir welding method involves a welding technique which utilizes the plastic fluidity of a metal fluidized in friction heat which is generated between the rotary tool and the member to be subjected to processing, whereby friction stir welding can be carried out (hereinafter, a friction stir welding method). Such a friction stir welding method has a characteristic in which, in comparison with fusion welding, such as arc welding, a solid phase welding is carried out wherein it is possible to weld without a fusion phenomenon. Accordingly, in the above stated friction stir welding method, since the heating temperature is low, there are many advantages, including the fact that the deformation of the member to be subjected to processing after the friction stir welding is small etc.

On the other hand, up to now, a railway car has been manufactured using an aluminum alloy. The aluminum alloy members of the railway car were fusion-welded using an arc welding method, and then the fusion welded members were assembled as a railway car. However, according to conventional arc welding characteristics, the deformation of the member to be subjected to processing by the arc welding is large, and repair of such deformation of the member to be subjected to processing requires necessarily much working time.

Herein, for the welding of a railway car when the above-stated friction stir welding method is employed, effects are attained in which the welding deformation of the member to be subjected to processing is small, and the welding of the front and the rear faces can be carried out because solid phase welding is carried out.

The above-stated friction stir welding utilizes the plastic fluidity produced by the friction heat generated between the rotary tool and a welding member to be subjected to processing. Accordingly, the friction stir welding characteristic differs largely for different kinds of aluminum alloys. As the aluminum alloy having a superior friction stir welding characteristic, it is desirable to employ an alloy having a superior plastic fluidity created by the friction heat between the rotary tool and the member to be subjected to processing.

However, all aluminum alloys do not necessarily have such a superior plastic fluidity. In the case of an aluminum alloy having an inferior plastic fluidity, a large resistance is present between the rotary tool and the welding member to be subjected to processing. Accordingly, the wear and tear on the rotary tool is large and the life time of the rotary tool becomes short.

In particular, in the case of railway car manufacturing, since the welding length is as long as 25 m as a maximum, when the wear and tear on the rotary tool is large, there is a large possibility that a welding defect will occur during the welding operation. As a result, when the welding member to be subjected to processing is long, it is impossible to continuously carry out the friction stir welding. Further, a large resistance is imposed on the welding member to be subjected to processing. Accordingly, it is necessary to make the welding member large in size, particularly in the thickness direction of the welding member to be subjected to processing.

However, when the size of the welding member to be subjected to processing is made large, since the railway car weight increases, it is not desirable from the point of view of high speed operation of the railway car. Further, in a case where the resistance of the rotary tool is large, the clamp force for fixing the welding member to be subjected to processing becomes large. Accordingly, the clamp tool size becomes large, causing problems concerning fixing of the welding member to be subjected to processing and the working performance.

On the other hand, in the above-stated friction stir welding method, since a surface of the welding portion of the welding member to be subjected to processing is cut off by the rotary tool, causing the surface of the welding portion of the welding member to be subjected to processing to have a recessed portion (a dent portion or a sink portion), a problem is created from the aspect of reliability of performance.

Further, in a conventional welding joint structure, metal, which has been subjected to plastic fluidity by the friction heat generated between the rotary tool and the welding member to be subjected to processing, flows from a groove portion, causing a problem in which a welding defect can be generated at the welding portion of the welding member to be subjected to processing.

SUMMARY OF THE INVENTION

An object of the present invention is to provide a structure comprised of an aluminum alloy having a low welding distortion and to provide a railway car comprised of an aluminum alloy having a low welding distortion.

According to the present invention, in a railway car, extruded frame members of an aluminum base alloy containing Si of 0.4-0.9 wt % and Mg of 0.4-1.2 wt % are welded using friction stir welding.

In a structure, an aluminum base alloy plate containing Si of 0.4-0.9 wt % and Mg of 0.4-1.2 wt % is prepared, and to one face of the aluminum base alloy plate a rib is formed, wherein the aluminum base alloy plate is an extruded frame member.

In a structure, two aluminum base alloy plates containing Si of 0.4-0.9 wt % and Mg of 0.4-1.2 wt % are prepared, and the two aluminum base alloy plates are formed integrally by a rib, wherein the respective aluminum base alloy plates are extruded frame members.

In a railway car, a welding portion of the extruded frame members is welded under a condition wherein the extruded frame members overlap each other.

In a railway car, a surface of a welding portion of the extruded frame member has a projection of a height of 0.5-3 mm.

In a structure, at an end portion of a face of the aluminum base alloy plate, a rib is provided vertically relative to the aluminum base alloy plate.

In a structure, at an outer face side of end portions of the two aluminum base alloy plates, a projection is provided.

In a structure comprising aluminum base alloy members containing Si of 0.4-0.9 wt % and Mg of 0.4-1.2 wt % which are welded at a welding portion using friction stir welding, to a welding side surface of the welding portion, a projection is provided before the friction stir welding is carried out.

In a method of manufacturing a structure in which aluminum base alloy members containing Si of 0.4-0.9 wt % and Mg of 0.4-1.2 wt % are welded, using a rotary tool by friction stir welding, to a welding side surface of a welding portion, a projection is provided, the rotary tool is inserted from a side of the projection, and then the friction stir welding is carried out.

The above-stated aluminum alloy is manufactured by an extrusion processing, and, after the processing, the aluminum alloy is subjected to a solution thermal processing and an aging (hardening) thermal processing.

The above-stated aluminum alloy is manufactured by an extrusion processing and a solution thermal processing at the same time, and after those processings, an aging (hardening) thermal processing is carried out.

A surface of a friction stir welding portion of the member to be subjected to processing, comprised of the above-stated aluminum alloy, is as high as 0.5-3 mm before the friction stir welding.

A part of the friction stir welding portion of the member to be subjected to processing, comprised of the above-stated aluminum alloy, is friction stir welded to the other member under a condition where the members overlap each other.

A car of a railway vehicle is manufactured by an extrusion processing of a member to be subjected to processing, comprised of the aluminum alloy, having a long size which is a maximum 26 m. Accordingly, it is necessary for the member to be made of an aluminum alloy having a superior extrusion processing performance.

Further, a railway car is required to have a superior mechanical strength. Thus, to lessen the welding distortion produced during welding and further to manufacture with a high reliability, in place of the conventional fusion welding, it is desirable to employ a friction stir welding method to which a solid phase welding is carried out.

As an aluminum alloy having a superior friction stir welding performance, it is desirable to carry out the aging (hardening) thermal processing, after the solution thermal processing of an aluminum alloy in which the Si content of 0.4-0.9 wt % and Mg content of 0.4-1.2 wt % are comprised as a main composition. In other words, as stated above, in a case where the railway car body comprised of an aluminum alloy is assembled by the friction stir welding method, it is desirable to use an aluminum alloy having a superior friction stir welding performance, a superior extrusion processing performance and a superior mechanical strength performance. As a result, according to the present invention, since an aluminum alloy having a superior friction stir welding performance, a superior extrusion processing performance and a superior mechanical strength performance is assembled in accordance with the above-stated friction stir welding method, then a railway car having the desired characteristics and advantages can be manufactured.

On the other hand, the appearance of a recessed portion (a dent portion) on the surface of the welding portion of the member to be subjected to processing due to the cut-off (the deletion) of the rotary tool is prevented by a method in which the welding portion of the member to be subjected to processing is provided with an area of increased height in advance. As to the height (H) of the welding portion of the member to be subjected to processing, the effect is small when a height (H) of less than 0.6 mm is employed, however a height (H) of more than 3 mm also is not desirable because the height which remains after the welding is excessive. Accordingly, as the height (H) of the welding portion of the member to be subjected to processing, it is desirable to employ a height of more than 0.6 mm, but less than 3 mm.

Further, an occurrence of a welding defect, produced by flow-out of the plastic fluidized welding metal which exists between the members to be subjected to processing, can be prevented by employing an arrangement in which, in a part of the welding joint portion, the members to be subjected to processing are overlapped on each other.

DESCRIPTION OF THE PRESENT INVENTION

Figure 1:
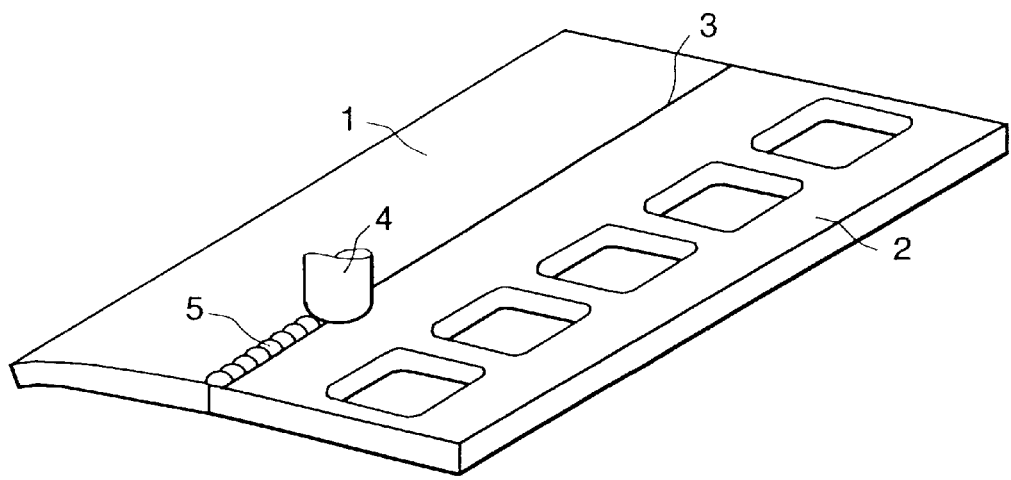
FIG. 1 is a perspective view showing a method of manufacturing a railway car body using a friction stir welding method according to one embodiment of the present invention.

Embodiment 1:

Different chemical compositions, aspects of the extrusion processing performance, the mechanical strength of a railway car, and the friction stir welding performance of a representative aluminum alloy are shown in Table 1.

TABLE 1

| No. | Chemical Composition (wt %) | | | EP | MS | FW | JIS* |
| --- | --- | --- | --- | --- | --- | --- | --- |
| | Si | Mg | Mn | | | | |
| 1 | 0.4–0.9 | 0.4–3.2 | less than 0.5 | ○ | ○ | ○ | A6000 system |
| 2 | 0.2–0.8 | 1.2–2.8 | 0.5–0.8 | X | ○ | X | A2000 system |
| 3 | less than 0.5 | 0.8–1.3 | 1.0–1.5 | ○ | X | ○ | A3000 system |
| 4 | less than 0.4 | 4.0–4.8 | 0.4–2.0 | X | ○ | Δ | A5000 system |

TABLE 1-continued

| | Chemical Composition (wt %) | | | | | | |
|---|---|---|---|---|---|---|---|
| No. | Si | Mg | Mn | EP | MS | FW | JIS* |
| 5 | less than 0.4 | 2.2–2.9 | less than 0.3 | X | ○ | X | A7000 system |

In Table 1, "EP" indicates extrusion processing performance, "MS" indicates mechanical strength performance, "FW" indicates friction welding performance, and "JIS*2 indicates JIS regulation correspondence.

The aluminum alloy No. 1 in the Table 1 is an aluminum alloy (corresponding to the JIS (Japanese Industry Standard) regulation A6000 system) comprised of a Si content of 0.4-0.9 wt % and a Mg content of 0.4-1.2 wt % as a main composition. This aluminum alloy has a superior friction stir welding performance, a superior extrusion processing performance and a superior mechanical strength performance. Further, this aluminum alloy is a thermal processing type aluminum alloy in which, after the extrusion processing, solution thermal processing and aging (hardening) thermal processing have been carried out.

The aluminum alloy No. 2 in the Table 1 is an aluminum alloy (corresponding to the JIS regulation A2000 system) comprised of a Si content of 0.2-0.8 wt %, which is substantially the same as that of No. 1, and a Mg content of more than 1.2 wt %. This aluminum alloy has a superior mechanical strength performance in the case of manufacture of a railway car, however there are problems concerning the extrusion processing performance and the friction stir welding performance.

The aluminum alloy No. 3 in the Table 1 is an aluminum alloy (corresponding to the JIS regulation A3000 system) comprised of a Mg content of 0.4-1.2 wt %, which is substantially the same as that of No. 1, and a Si content of less than 0.6 wt %. This aluminum alloy has a good extrusion processing performance and friction stir welding performance in the case of manufacture of a railway car, however there is a problem concerning the mechanical strength performance.

The aluminum alloy No. 4 in the Table 1 is an aluminum alloy (corresponding to the JIS regulation A5000 system) comprised of a Si content of less than 0.4 wt % and a Mg content of 4.0-4.9 wt %. This aluminum alloy has a superior mechanical strength performance in the case of manufacture of a railway car, however there is a problem concerning the extrusion processing performance.

The aluminum alloy No. 5 in the Table 1 is an aluminum alloy (corresponding to the JIS regulation A7000 system) comprised of a Si content of less than 0.4 wt % and a Mg content of 2-2.9 wt %. This aluminum alloy has a superior mechanical strength performance in the case of manufacture of a railway car, however there are problems concerning the extrusion processing performance and the friction stir welding performance.

As stated above, the aluminum alloy No. 1 having a superior friction stir welding performance, a superior extrusion processing performance and a superior mechanical strength performance is the aluminum alloy (corresponding to the JIS regulation A6000 system) comprised of a Si content of 0.4-0.9 wt % and a Mg content of 0.4-1.2 wt % as the main composition, and this aluminum alloy is subjected to solution thermal processing and aging (hardening) thermal processing. The railway car is manufactured in accordance with the present invention by friction stir welding using this aluminum alloy, and the use of this aluminum alloy provides for a low distortion and a light weight structure and a high reliability.

In the aluminum alloy (JIS regulation 6000 system) comprised of the above-stated compositions, the mechanical strength performance at room temperature is high, however the deformation resistance performance at a high temperature is small in comparison with the other aluminum alloys. For example, the tensile strength at room temperature of the above-stated 6000 system aluminum alloy is substantially the same as that of the aluminum alloy No. 4 (5000 system) shown in Table 1.

However, the deformation resistance at 400° C. in the 5000 system aluminum alloy is 20 kg/mm$^2$, but the deformation resistance at 400° C. in the 6000 system aluminum alloy is as small as 10 kg/mm. For the 6000 system aluminum alloy, the 6NO1 material member aluminum alloy is small at 8 kg/mm$^2$. The small deformation resistance performance means that the extrusion processing performance is carried out easily. Namely, a wide width material member can be processed for a long weld and a stable extrusion processing can be carried out.

On the other hand, in the friction stir welding method according to the present invention, using the 5000 system aluminum alloy having a large deformation performance at a high temperature, since the friction resistance between the rotary tool and the member to be subjected to welding is large, the friction heat becomes large, and, accordingly, the deformation of the member to be subjected to welding becomes large.

In contrast to the 5000 system aluminum alloy having a large deformation performance at a high temperature, in the 6000 system aluminum alloy having a small deformation performance at a high temperature, since the friction resistance between the rotary tool and the member to be subjected to welding is small, and since the resistance burdened on the rotary tool and the member to be subjected to welding is small, the welding can be carried out in a stable manner. In particular, for the 6000 system aluminum alloy, in a 6NO1 material member aluminum alloy, it is possible to carry out a stable welding.

Embodiment 2

FIG. 1 shows a perspective view of a car body of a railway car in which a part of a side outer plate of the railway car is welded according to a friction stir welding method. At the center of the welding groove line 3 between side plate 1 and side plate 2 of the railway car, a rotary tool 4 is inserted. By rotating and moving the rotary tool 4 in the welding direction, a welding portion 5 between the side of plate 1 and the side of plate 2 is formed.

Figure 2:
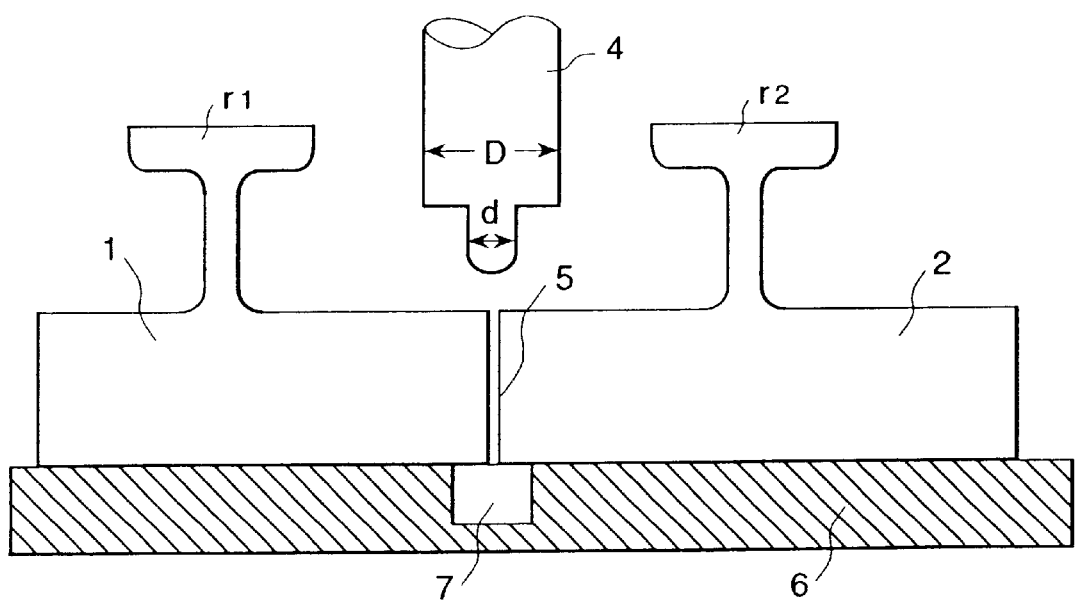
FIG. 2 is a cross-sectional view in which a welding portion of the members to be subjected to processing as shown in FIG. 1 is enlarged.

FIG. 2 an enlarged cross-sectional view of the structure in the vicinity of the welding portion 5 of the side of plate 1 and the side of plate 2 shown in FIG. 1. As shown in FIG. 2, the plate 1 and the plate 2 are fixed to a backing plate 6. The plate 1 has a rib r1 and the plate 2 has a rib r2. Just right under the welding portion 5 of this backing plate 6, a groove 7 is formed. In this groove 7, a part of a rear side of the welding portion 5 is located. Accordingly, since a non-welding portion is not formed at a rear face of the welding portion 5, a sound friction stir welding can be carried out.

In this Embodiment 2 according to the present invention, after the aluminum alloy comprised of a following composition (weight) is extrusion-processed, solution thermal processing and aging (hardening) thermal processing are carried out.

Si: 0.40-0.8 wt %, Fe less than 0.7 wt % (preferably 0.1-0.6 wt %), Cu 0.15-0.40 wt %, Mn: less than 0.15 wt % (preferably 0.05-0.13 wt %), Mg: 0.8-1.2 wt %, Cr: 0.04-

0.35 wt %, Zn: less than 0.10 wt % (preferably 0.03-0.10 wt %), and other metals except for Al: less than 0.15 wt % (preferably 0.03-0.10 wt %).

Further, the aluminum alloy comprised of the above stated composition corresponds to an alloy number A6000 of the Japanese Industry Standard (JIS). The mechanical strength characteristic after the thermal processing of the above-stated aluminum alloy has a tensile strength of 30 kg/mm$^2$, a durable force of 25 kg/mm, and an elongation rate of 13%.

The above-stated aluminum alloy is processed using extrusion processing and has a rib structure comprised of the rib r1 and the rib r2 having a thickness of 4 mm, a width of 500 mm, and a length of 20 mm. Further, the rotary tool 4 for the friction stir welding is made of a material substantially harder than the welding member to be subjected to processing. In this Embodiment 2 according to the present invention, as the material of the rotary tool 4, a heat resistance steel of Ni base is used.

The rotary tool 4 comprises a thick portion (hereinafter, a shoulder portion) and a narrow portion (hereinafter, a tool tip portion). The diameter (D) of the shoulder portion of the rotary tool 4 is larger by at least 2-3 times than the diameter (d) of the tool tip end portion of the rotary tool 4.

Further, on the tool tip end portion, an ordinary screw member is provided. Further, in this Embodiment 2 according to the present invention, the shoulder portion diameter (D) of the rotary tool 4 is 15 mm, the tool tip end portion diameter (d) of the rotary tool 4 is 5 mm, the speed of rotation of the rotary tool 4 is 1500 rpm, and the welding speed is 400 mm/min.

Figure 3:
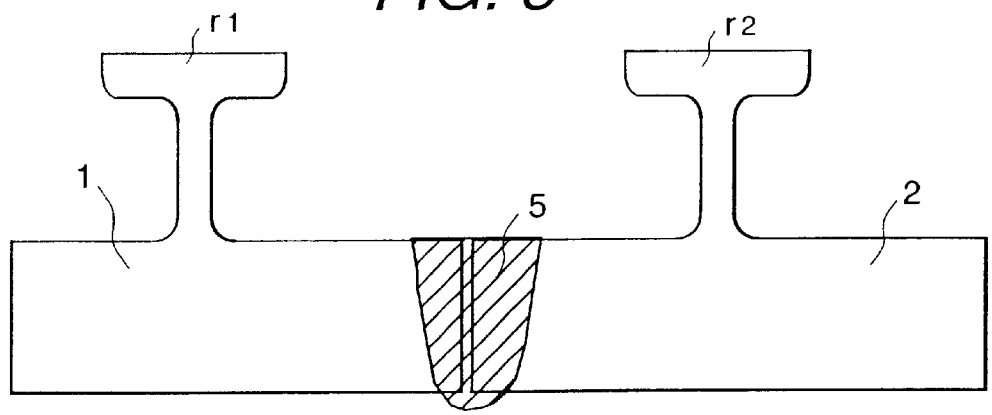
FIG. 3 is a cross-sectional view of the welding portion of the members to be subjected to processing as shown in FIG. 2.
Figure 4:
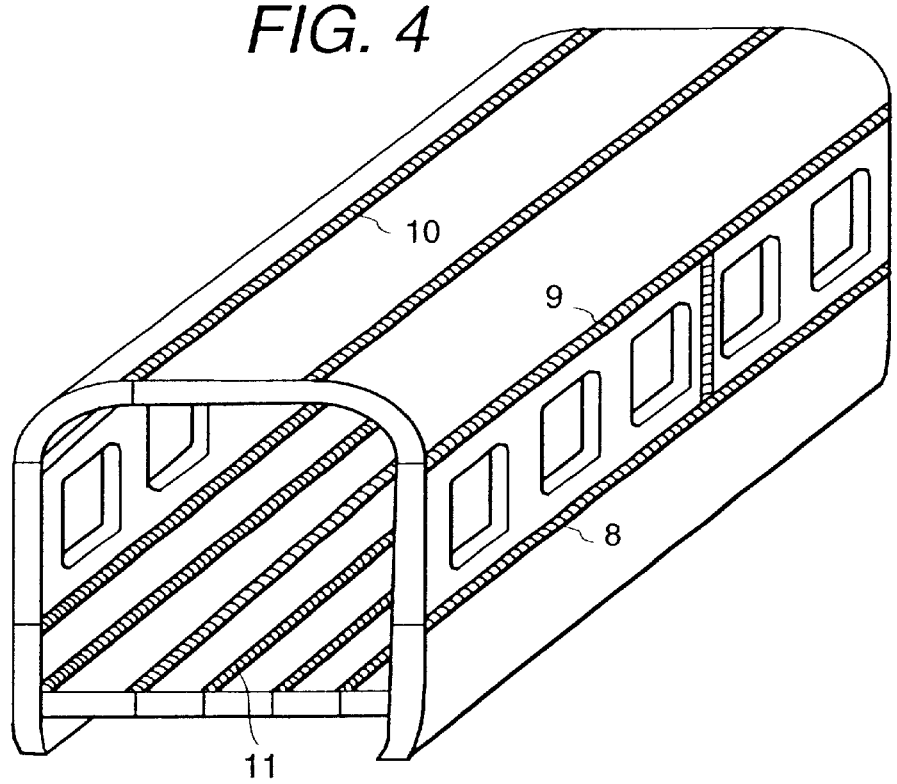
FIG. 4 is a perspective view showing a railway car which is manufactured using a friction stir welding method according to the present invention.

FIG. 3 shows a cross-section of the welding portion which is welded according to the above-stated friction stir welding method. FIG. 4 is a perspective view of a railway car which is manufactured by welding plural structural bodies, which are friction stir welded as shown in FIG. 3. Welding lines 11 and 8 represent friction stir welding portions. Further, the railway car shown in FIG. 3 is welded partially using an arc welding method. Reference numerals 9 and 10 identify arc welding portions.

Since the above-stated 6000 system aluminum alloy has a small deformation resistance performance at a high temperature, the welding range is wide, and the friction stir welding can be carried out in a stable manner even in the case of a long material member. Further, the lowering of the strength of the welding portion as a result of the friction stir welding is less than that of the arc welding. Further, in comparison with the 5000 system aluminum alloy having a large deformation resistance, the deformation after welding using the above-stated 6000 system aluminum alloy is small, and, as a result, a high quality railway car can be manufactured.

Embodiment 3

Figure 5:
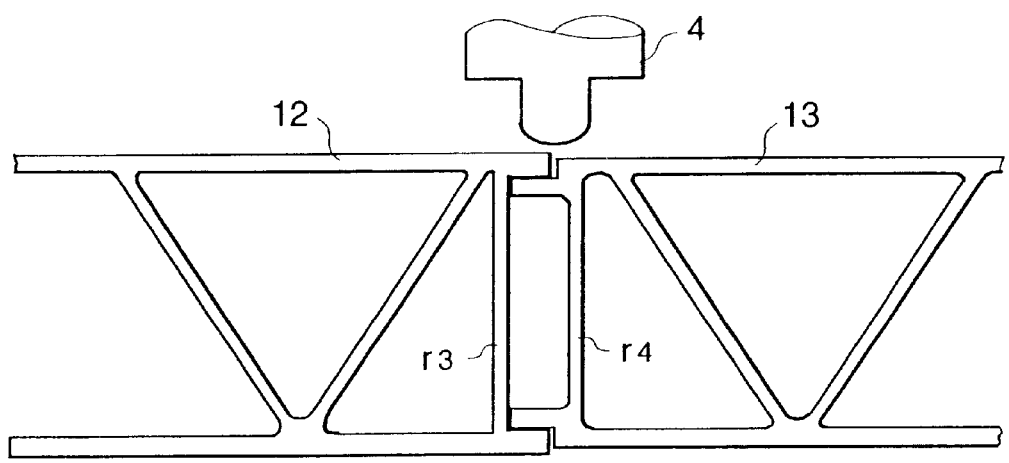
FIG. 5 is a cross-sectional view showing a hollow body structure which is manufactured using an extrusion processing method to form a railway car using friction stir welding according to another embodiment of the present invention.
Figure 6:
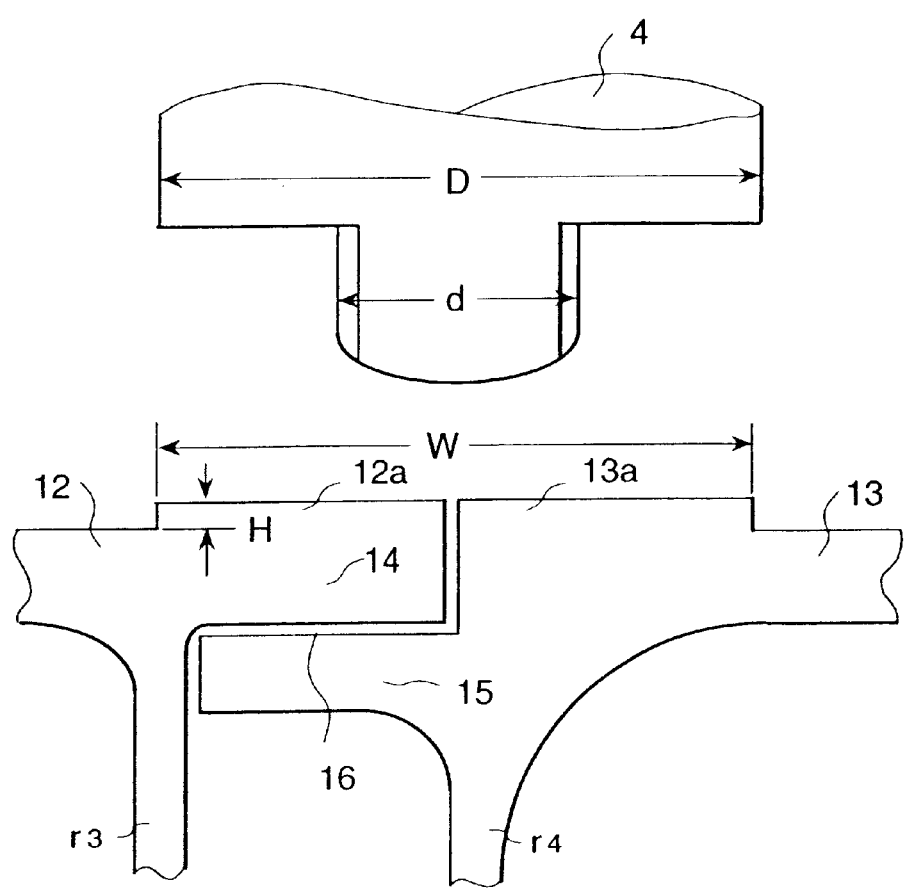
FIG. 6 is an enlarged cross-sectional view showing a welding joint structure of the members to be subjected to processing as shown in FIG. 5.

FIG. 5 shows a structure formed of two extruded frame members having a hollow interior portion, which is manufactured by an extruding transformation (hereinafter, an extruded frame member), and an arrangement of the rotary tool. FIG. 6 shows an enlarged cross-sectional view of a part in the vicinity of the welding portion of the two extruded frame members shown in FIG. 5.

As shown in FIG. 5 and FIG. 6, the extruded frame members are friction stir welded in accordance with the present invention under a condition in which an end portion 14 of one extruded frame member 12 is overlapped on an end portion 15 of another extruded frame member 13. Namely, the end portion 14 of the one extruded frame member 12 is supported by the end portion 15 of the another extruded frame member 13. The extruded frame member 12 has a vertical rib r3 and the extruded frame member 13 has a vertical rib r4.

With the above-stated construction, even when the gap of the groove line of the welding is opened largely, the flow toward a lower portion of the metal which is softened by plastic fluidization is checked by the overlapped portion 16 of the end portions of the two extruded frame members 12 and 13. As a result, even when the gap is large, a welding defect does not occur in the welding portion of the two extruded frame members 12 and 13, and the reliability performance of the welding portion of the two extruded frame members 12 and 13 can be improved.

On the other hand, as shown in FIG. 6, a part of the welding portion of the two extruded frame members 12 and 13 is extended by the distance H. Namely, the extruded frame member 12 has a high portion 12a on the upper portion of the end portion 14, and the extruded frame member 13 has a high portion 13a which is oppositely arranged relative to the high portion 12a of the extruded frame member 12.

Since a part of the welding portion of the two extruded frame members 12 and 13 is cut off by the rotary tool 4 and a recessed portion (dent portion or sink portion) is formed in the surface of the welding portion of the two extruded frame members 12 and 13, the members are made high (provided with the high portion 12a and the high portion 13a) in advance to provide a part in which the surface of the two extruded frame members 12 and 13 is cut off and the thickness of the two extruded frame members 12 and 13 is reduced.

The height (H) of the high portion 12a provided on the extruded frame member 12 and the high portion 13a provided on the extruded frame member 13 in this Embodiment 3 according to the present invention is 1 mm. It is desirable to make the width (W) of the high portion 12a of the extruded frame member 12 and the high portion 13a of the extruded frame member 13 to be substantially the same as the diameter (D) of the thick portion (the shoulder portion) of the rotary tool 4.

In this Embodiment 3 according to the present invention, after the aluminum alloy having a following composition (weight) is extrusion processed, solution thermal processing and aging (hardening) thermal processing are carried out. Following elements can be formed to have a preferable contents similarly to the above.

Si: 0.40-0.9 wt %, Fe less than 0.35 wt % (preferably 0.35-0.1 wt %), Cu less than 0.35 wt % (preferably 0.35-0.1 wt %), Mn less than 0.50 wt % (preferably 0.3-0.05 wt %), Mg 0.40-0.8 wt %, Cr: less than 0.30 wt % (preferably 0.3-0.05 wt %) Zn: less than 0.25 wt % (preferably 0.25-0.05 wt %), Ti less than 0.10 wt % (preferably 0.1-0.05 wt %), and other metals except for Al: less than 0.15 wt %. (Mn+Cr: less than 0.50 wt %).

Further, the aluminum alloy having the above-stated composition corresponds to an alloy number A6NO1 of the Japanese Industry Standard (JIS). The mechanical strength characteristic after the thermal processing of the above-stated aluminum alloy has a tensile strength of 29 kg/mm$^2$ a durable force of 25 kg/mm, and an elongation rate of 12%.

After this aluminum alloy has been extrusion processed to have a length of 25 m, the solution thermal processing and the aging (hardening) thermal processing are carried out. Further, the welding conditions of this Embodiment 3 according to the present invention are the same as those of the Embodiment 1 according to the present invention.

Figure 7:
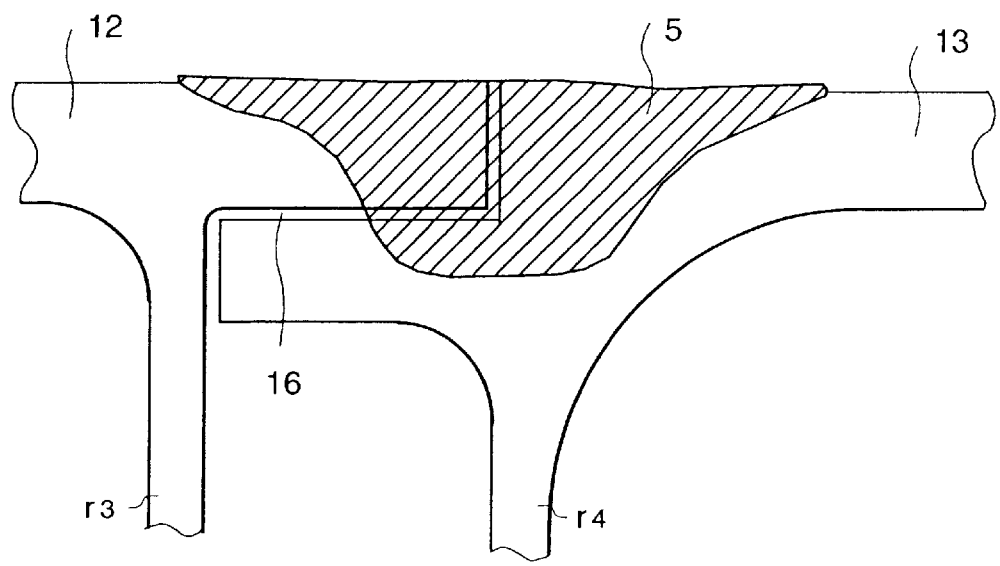
FIG. 7 is an enlarged cross-sectional view showing the weld after the welding process shown in FIG. 5 and FIG. 6.

FIG. 7 shows a cross-section of the welding portion of the two extruded frame members 12 and 13 which have been welded according to the above-stated friction stir welding method. As shown in FIG. 7, the railway car is manufactured by welding plural structural bodies using the friction stir welding process shown in FIG. 4.

Figure 8:
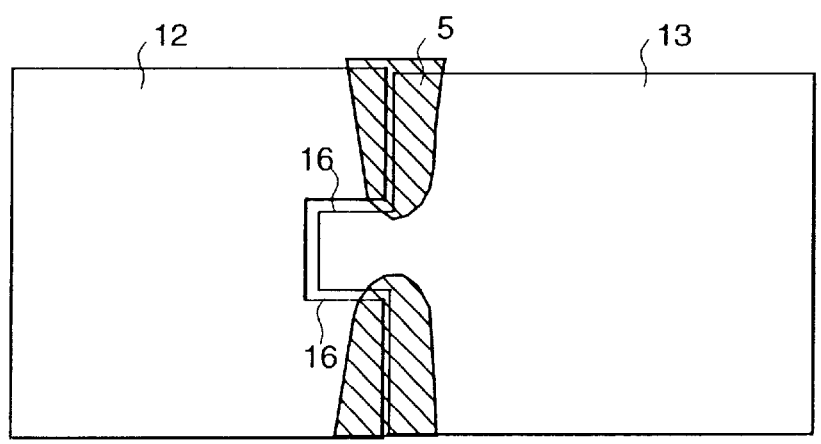
FIG. 8 is a cross-sectional view showing the welding joint structure of the members to be subjected to processing.

Embodiment 4:

FIG. 8 shows a welding joint structure for a case in which the floor plates of the railway car, which is manufactured by extrusion transformation, are welded to each other using the above-stated friction stir welding method. A characteristic shown in FIG. 8 is an inlaying structure of an interior portion of a welding groove formed between the two extruded frame members 12 and 13. By this structure, a setting of the welding can be carried out easily.

Further, the metal which is softened by plastic fluidization is pushed out toward the tip end portion by the rotary tool 4, so that the occurrence of a welding defect in the interior portion of the welding portion of the two extruded frame members 12 and 13 can be prevented.

In this Embodiment 4 according to the present invention, after the aluminum alloy having a following composition (weight) is extrusion processed, solution thermal processing and aging (hardening) thermal processing are carried out.

Si: 0.40-0.9 wt %, Fe: less than 0.35 wt % (preferably 0.35-0.1 wt %), Cu: less than 0.35 wt % (preferably 0.36-0.1 wt %), Mn: less than 0.50 wt % (preferably 0.35-0.1 wt %), Mg: 0.40-0.8 wt %, Cr: less than 0.30 wt % (preferably 0.3-0.05 wt %), Zn: less than 0.25 wt % (preferably 0.25-0.05 wt %), Ti: less than 0.10 wt % (preferably 0.1-0.05 wt %), and other metals except for Al: less than 0.15 wt %. (Mn+Cr: less than 0.05 wt %).

Further, the aluminum alloy having the above-stated composition corresponds to the alloy number A6N01 of the Japanese Industry Standard (JIS). The mechanical strength characteristic after the thermal processing of the above stated aluminum alloy has a tensile strength of 29 kg/mm$^2$, a durable force of 25 kg/mm, and an elongation rate of 12%.

After this aluminum alloy has been extrusion processed to have a length of 15 m, the solution thermal processing and the aging (hardening) thermal processing are carried out. Further, the welding conditions of this Embodiment 3 according to the present invention are the same as those of the Embodiment 1 according to the present invention.

According to the present invention, a railway car can be manufactured using an aluminum alloy containing Si of 0.4-0.9 wt % and Mg of 0.4-1.2 wt % according to the friction stir welding method.

According to the present invention, a welded structure having a low welding distortion and a light weight and the high reliability, in particular a railway car for a high speed railway, can be manufactured.

What is claimed is:

1. A structural body comprising:
   hollow extruded frame members including integrally formed ribs between two face plates, and comprised of an aluminum base alloy containing 0.4-0.9 wt % Si and 0.4-1.2 wt % Mg;
   end faces of said hollow extruded frame members are welded together, at a weld portion, by a friction stir welding with insertion of a rotary tool;
   an end portion of one of said hollow extruded frame members at said weld portion is overlapped with an end portion of another of said hollow extruded frame members, providing an overlapped portion;
   surfaces of the face plates at a side of said rotary tool of both hollow extruded frame members in said overlapped portion have substantially a same height; and
   before the welding, each of said hollow extruded frame members has a raised portion having a height of 0.5-3 mm in a surface in said rotary tool side of a portion of said each of said hollow extruded frame members which corresponds to said weld portion.

2. A structural body according to claim 1, wherein at least one of said hollow extruded frame members has a rib which is arranged substantially perpendicular to said two face plates in an end portion thereof at a vicinity of said weld portion.

3. A structural body according to claim 1, wherein said aluminum base alloy includes 0.4-0.9 wt % Si, less than 0.35 wt % Fe, less than 0.35 wt % Cu, less than 0.5 wt % Mn, 0.4-0.8 wt % Mg, less than 0.30 wt % Cr, less than 0.25 wt % Zn, less than 0.10 wt % Ti, and less than 0.15 wt % other metals than Al.

4. A structural body according to claim 3, wherein the hollow extruded frame members have been subjected to solution thermal processing and aging thermal processing.

5. A structural body according to claim 1, wherein said aluminum base alloy includes 0.4-0.9 wt % Si, 0.35-0.1 wt % Fe, 0.35-0.1 wt % Cu, 0.3-0.05 wt % Mn, 0.3-0.05 wt % Cr, 0.35-0.05 wt % Zn, 0.1-0.05 wt % Ti, and less than 0.15 wt % other metals than Al, with amount of Mn+Cr being less than 0.50 wt %.

6. A structural body according to claim 5, wherein the hollow extruded frame members have been subjected to solution thermal processing and aging thermal processing.

7. A method of manufacturing a structural body comprising hollow extruded frame members having integrally formed ribs between two face plates, and comprised of an aluminum base alloy containing 0.4-0.9 wt % Si and 0.4-1.2 wt % Mg, and with end faces of said hollow extruded frame members being welded together, at a weld portion, by a friction stir welding with insertion of a rotary tool, the method comprising:
   overlapping an end portion of one of said hollow extruded frame members at a location corresponding to said weld portion with an end portion of another of said hollow extruded frame members, providing an overlapped portion;
   setting face plates, at a side of said rotary tool, of both hollow extruded frame members, in said overlapped portion to have substantially a same height; and
   before the welding, forming each of said hollow extruded frame members to have a raised portion having a height of 0.5-3 mm in a surface in said rotary tool side of a portion of said each of said hollow extruded frame members which corresponds to said weld portion.

8. A method of manufacturing a structural body according to claim 7, wherein at least one of said hollow extruded frame members has a rib which is arranged substantially perpendicular to said two face plates in an end portion thereof at a vicinity of said weld portion.

9. A method of manufacturing a structural body according to claim 7, wherein said aluminum base alloy includes 0.4-0.9 wt % Si, less than 0.35 wt % Fe, less than 0.35 wt % Cu, less than 0.5 wt % Mn, 0.4-0.8 wt % Mg, less than 0.30 wt % Cr, less than 0.25 wt % Zn, less than 0.10 wt % Ti, and less than 0.15 wt % other metals than Al.

10. A method of manufacturing a structural body according to claim 9, wherein the hollow extruded frame members have been subjected to solution thermal processing and aging thermal processing.

11. A method of manufacturing a structural body according to claim 7, wherein said aluminum base alloy includes 0.4-0.9 wt % Si, 0.35-0.1 wt % Fe, 0.35-0.1 wt % Cu, 0.3-0.05 wt % Mn, 0.3-0.05 wt % Cr, 0.35-0.05 wt % Zn, 0.1-0.05 wt % Ti, and less than 0.15 wt % other metals than Al, with amount of Mn+Cr being less than 0.50 wt %.

12. A method of manufacturing a structural body according to claim 11, wherein the hollow extruded frame members have been subjected to solution thermal processing and aging thermal processing.

* * * * *